March 13, 1956 LA VERN H. DE HAVEN 2,738,200
TWO WHEELED AGRICULTURAL TRAILER FOR SUPPORTING WORKERS
Filed Oct. 6, 1951
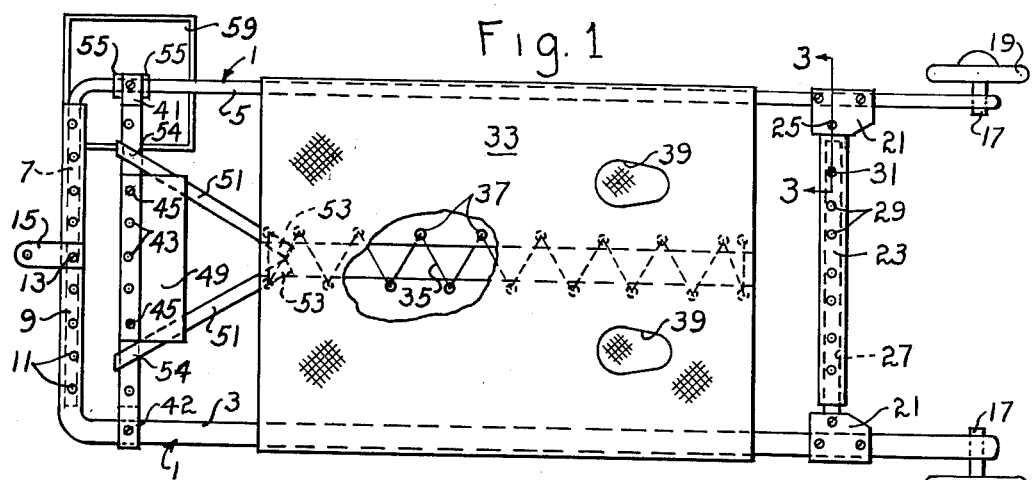
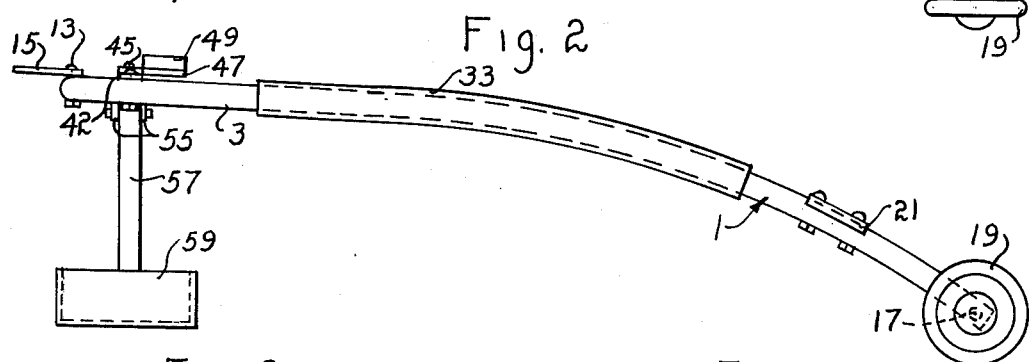
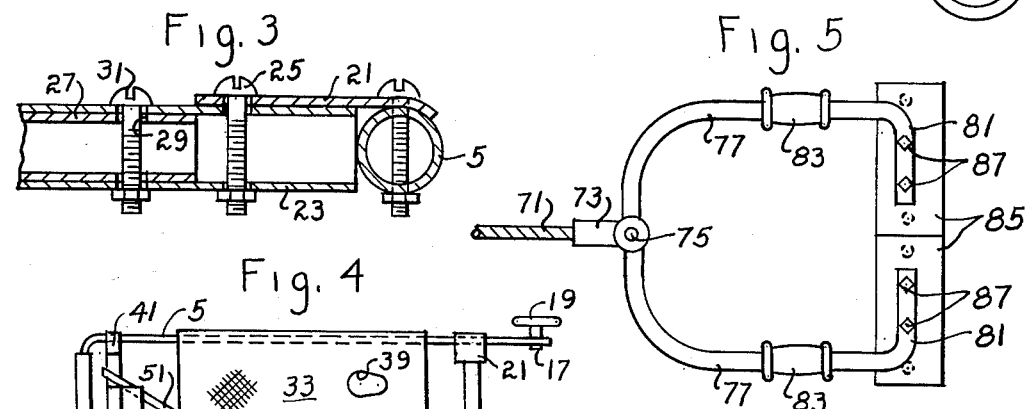
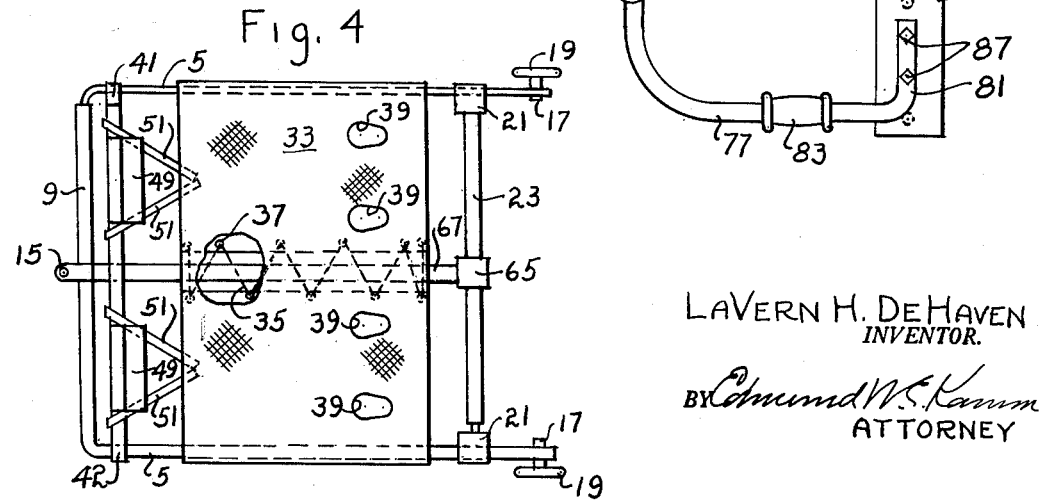
LaVern H. DeHaven
INVENTOR.
BY Edmund W. S. Kamm
ATTORNEY United States Patent Office 2,738,200
Patented Mar. 13, 1956

2,738,200

TWO WHEELED AGRICULTURAL TRAILER FOR SUPPORTING WORKERS

La Vern H. De Haven, Fort Wayne, Ind., assignor to Feng, Incorporated, Fort Wayne, Ind., a corporation of Indiana Application October 6, 1951, Serial No. 250,130

7 Claims. (Cl. 280—32.5)

This invention relates to an agricultural trailer. More specifically, it relates to a trailer adapted for attachment to a tractor for supporting a worker's body in a prone position to facilitate planting, cultivating and harvesting the fruit of small or low growing plants.

It has long been recognized that planting, cultivating and picking the fruit from small or low growing plants such as strawberries, peas, tomatoes, potatoes, etc. is the most arduous of agricultural work because of the unnatural stooping posture required of the person performing such work.

It is an object of the invention to provide a trailer which will support the body of a person in a prone position, with his hands and arms free to do the necessary work while he is transported lengthwise of the rows of plants by a tractor. It has been found by actual operation that a worker has sufficient reach to be able to effectively perform the work when he is thus suspended above the plants.

Further, it is possible to thus transport a reasonable number of workers along the rows so that several rows may be worked at each pass.

It is also an object to provide means for supporting suitable containers for plants or fruit within easy reach of the worker so that such container is transported with him without effort on his part.

Another object is to provide means for adjusting the width of the vehicle to comply with the distance between rows of the crop.

A further object is to provide means for supporting the body, head and shoulders of the worker so that he will be comfortable.

These and other objects will become apparent from a study of this specification and the drawings which are attached hereto, made a part hereof and in which:

Figure 1 is a plan view of the trailer showing the body supporting means, frame, wheels and other parts.

Figure 2 is a side elevation of the apparatus of Figure 1 and showing the tray.

Figure 3 is a detailed, sectional view of the telescopic brace construction taken substantially on line 3—3 of Figure 1.

Figure 4 is a plan view similar to Figure 1 showing a trailer for two workers.

Figure 5 is a plan view of a cultivating tool for use with the trailer.

Referring now to Figure 1, numeral 1 represents a frame which is substantially inverted U-shaped and is made of two tubular L-shaped frame members 3 and 5 which have their short portions 7, 9 telescoped. A series of holes 11 are formed through the short portions so that they may be held in any particular telescoped condition demanded by the width of the crop rows. They are held in selected position by a bolt 13 which is also used to connect to the frame the hitch means 15 by which the trailer is attached to the draw bar of a tractor.

As shown in Figures 1 to 3 stub axles 17 are welded or otherwise fixed to the free lower ends of the upwardly bowed side rails and suitable wheels 19 are rotatably mounted thereon.

The side rails of frame members 3 and 5 are bent or bowed upwardly as shown in Figure 2 and bolted or otherwise fixed to each piece, at a height which is sufficient to clear the plants or to pass through them without injury to them, is a gusset 21. A tubular brace 23 is attached to the gusset by bolt 25. A similar tubular brace 27 is fixed to the gusset on member 3 and is telescopically received in the brace 23. A series of holes 29 are formed in the two braces and a bolt 31 is inserted in selected aligned holes to hold the brace in the extended position required by the row spacing.

This brace serves not only to space the ends of the frame but also as a foot rest for the worker so that he may maintain or adjust himself longitudinally of the trailer.

A web 33 of canvas or other material is looped over the frame members and the edges are joined by suitable lacing 35 which preferably enters eyelets 37 mounted in the cloth.

I prefer to provide laterally holes 39 in the upper portion of the web to permit the operator's knees to pass through it, since I find this conducive to comfort.

A pair of flat bars 41, 42 which may be of wood, are fixed to the frame members 3 and 5 and extend toward each other in overlapping relation and are provided with alignable holes 43 which receive bolts 45. These bolts also hold the headboard 47 in place on the bars so that the pad 49 of sponge rubber or other suitable resilient material will be properly positioned to support the forehead of the worker. If desired, this headboard may be adjustable toward and from the worker to compensate for variations in height.

Shoulder supporting straps 51, also preferably of canvas, are sewn at one end to the center of the top edge of the upper layer of web as at 53 and extend divergently to the outer ends of the bars 41, 42 which are received in suitable loops 54 which are formed by doubling back the ends of the straps and sewing the ends to the straps or in any other suitable manner.

These straps support that portion of the body extending between the neck and the point of the shoulder. They also prevent the web 33 from sliding down on the side rails.

Suspended from the frame by hooks 55 or other suitable means is the center post 57 of a tray 59 which may be used to hold the fruit picked by the worker or baskets such as are used for strawberries. When the tray is filled it may be unhooked and replaced by an empty tray.

The method of use of the device is easily understood. The bolts 13, 31 and 45 are removed from their associated parts and the lacing 35 is loosened (if the width of the trailer is to be increased) and the frame brace and bars are adjusted to the width required by the rows of plants to be worked and are rebolted. The canvas web is then laced to the proper tension. The hitch means is attached to the tractor, the tray is attached and the operator takes his place, resting his feet on the brace 23, his body resting on the web 33, his head resting on the support 49 and his arms dangling between the straps 51 and rails 3 and 5 respectively. The knees of the operator rest in the openings 39 and this permits the legs to bend slightly and increases the comfort of the worker.

The worker's arms are free to move in any direction to perform the required work whether this be planting young plants, cultivating or fertilizing growing plants, picking fruit or whatever the task may be while the tractor draws the worker along the row or rows, it being understood that where the rows are not too far apart one worker can easily reach two rows or more. In planting, the rows may be spaced with the view of using the trailer to best advantage in working them.

While the tractor must of necessity move comparatively slowly over the rows, the fact that the worker does not become fatigued, being in a natural position, greatly increases the amount of work which can be performed as compared with that done by present methods.

*Multiple workers*

As shown in Figure 4 the trailer may be constructed for a number of workers by lengthening the portions 7 and 9 of the frame members, bars 41, 42 and braces 23, 27.

In order to prevent the bodies of the workers from gravitating toward the center of the vehicle, I prefer to provide one or more spacer members, each of which comprise a collar 65 which is loosely slipped on the brace and which has fixed to it a tube 67 which is disposed longitudinally of the vehicle and is bolted to the frame at the head end by suitable bolts, the bolt 13 may be used when one tube is used. The web 33 is wrapped around the frame and tube 67 as before and the lacing may be applied so as to span the tube or if desired, it may be entirely above the tube 67 so that individual pockets will be formed by the bodies of the workers.

Of course, a number of head rests 47—49, straps 51, trays 59 and knee holes 39 sufficient to accommodate the number of workers used are employed.

*Cultivating attachment*

I have devised a simple cultivating attachment for breaking up the ground between the adjacent plants in a row. This comprises a cable 71 or rope which may be attached at one end to the frame member 9 so as to trail behind it. To the trailing end of the cable is attached a fulcrum block 73 to which are pivotally mounted on a pivot pin 75 a pair of bowed levers 77 which terminate in inwardly directed arms 81; and to which suitable tines or other cultivating implements 85 may be attached by bolts 87 or other suitable fastening means.

Intermediate the pivot and the arm 81 a hand grip 83 is provided.

In operation the grips are held by the operator so that he may hold the cultivating tools at the proper depth in the ground and also pivot the levers to open and close them in the manner of tongs to avoid the plant as it is approached.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. An agricultural trailer comprising an inverted, U-shaped frame having side rails bowed upwardly, a wheel rotatably mounted at the free lower end of each rail, a body supporting web supported between said side rails, body supporting straps each having one end attached centrally to the forward portion of the web, extending divergently therefrom and means for supporting the opposite ends of the straps on the forward portion of the frame.

2. An agricultural trailer comprising an inverted, U-shaped frame having side rails bowed upwardly, a wheel rotatably mounted at the free lower end of each rail, a body supporting web supported between said side rails, a head rest, means for attaching the head rest to the frame forwardly of the web, body supporting straps each having one end attached centrally to the forward portion of the web, extending divergently therefrom and means for supporting the opposite ends of the straps on the forward portion of the frame.

3. An agricultural trailer comprising two L-shaped frame members having their short arms extensibly joined and their other arms forming side rails and being bowed upwardly, means for holding said short arms in any of a number of extended positions, a wheel rotatably mounted at the free lower end of each side rail, an extensible brace connected at either end to the side rails, and a web supported between said side rails, means for adjusting the width of the web to conform to the width of said frame.

4. An agricultural trailer comprising two L-shaped frame members having their short arms extensibly joined and their other arms forming side rails and being bowed upwardly, means for holding said short arms in any of a number of extended positions, a wheel rotatably mounted at the free lower end of each side rail, an extensible brace connected at either end to the side rails, a web supported between said side rails, means for adjusting the width of the web to conform to the width of said frame, an extensible bar connected to the side rails adjacent the forward ends thereof, a head rest fixed to the bar, a pair of body supporting straps each having one end attached centrally toward the forward portion of the web and extending divergently and forwardly, and means for supporting the other ends of the straps from the frame forwardly of the edge of the web.

5. An agricultural trailer comprising two L-shaped frame members having their short arms connected and their other arms forming side rails and being bowed upwardly, a wheel rotatably mounted at the free lower end of each side rail, a brace connected at each end to a side rail, a central, upwardly bowed rail member, means for attaching said central member to the brace and to the forward end of the frame, and a web supported by said side rails and central rail to form two pockets.

6. The structure defined in claim 5 wherein the frame members, braces and web comprise means for rendering them laterally extensible and contractible.

7. An agricultural trailer comprising two L-shaped frame members having their short arms connected and their other arms forming side rails and being bowed upwardly, a wheel rotatably mounted at the free lower end of each side rail, a brace connected at each end to a side rail, an upwardly bowed rail member connected at either end to the brace and to the forward end of the frame and spaced from and substantially parallel to the side rails and a web supported by said side rails and rail member to form a number of pockets.

References Cited in the file of this patent

UNITED STATES PATENTS

| | | |
|---|---|---|
| 224,390 | Cole | Feb. 10, 1880 |
| 536,309 | Wilcox | Mar. 26, 1895 |
| 783,496 | Yeatman | Feb. 28, 1905 |
| 1,370,347 | Nelson (A) | Mar. 1, 1921 |
| 1,687,948 | Olsen | Oct. 16, 1928 |
| 2,277,302 | Chenette | May 24, 1942 |
| 2,302,246 | Nelson (B) | Nov. 17, 1942 |
| 2,317,606 | Harris | Apr. 27, 1943 |
| 2,460,466 | Nogle | Feb. 1, 1949 |
| 2,503,314 | Atwood | Apr. 11, 1950 |

FOREIGN PATENTS

| | | |
|---|---|---|
| 12,707 | Australia | Dec. 20, 1933 |